United States Patent Office 3,372,422
Patented Mar. 12, 1968

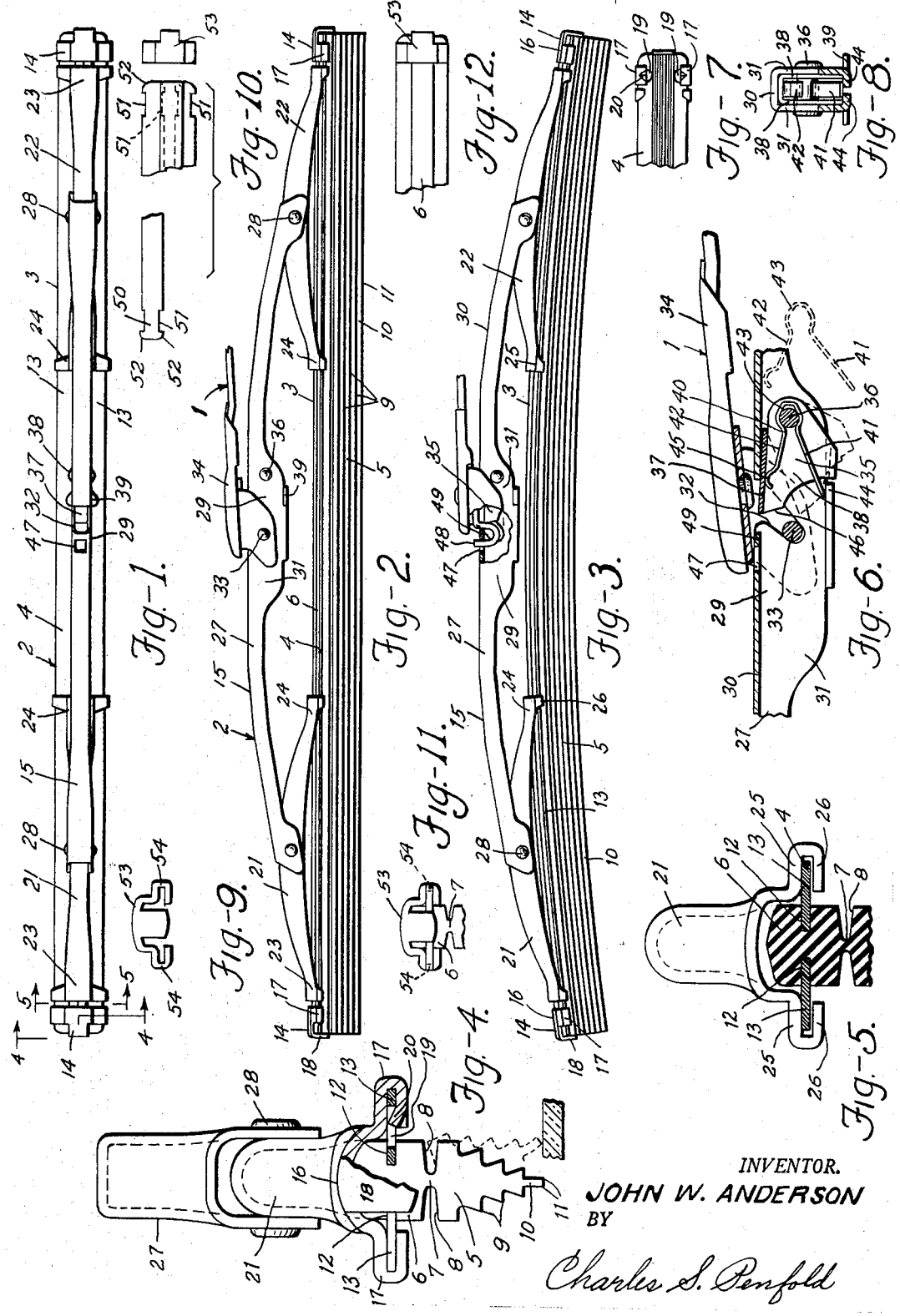

3,372,422
WINDSHIELD WIPER BLADE AND
CARRIAGE ASSEMBLY
John W. Anderson, Gary, Ind., assignor, by mesne assignments, to The Anderson Company, a corporation of Indiana
Filed Aug. 7, 1947, Ser. No. 766,956
10 Claims. (Cl. 15—250.42)

This invention relates generally to windshield or window cleaners or wiper devices and more particularly is directed to a device adapted to clean or wipe a curved surface as well as a substantially plane surface, and is related to a similar device shown in the copending applications of John W. Anderson, Ser. No. 634,729 filed Dec. 13, 1945, for Windshield Cleaner, and Ser. No. 634,730 filed Dec. 13, 1945, for Windshield Wiper Blade Linkage Assembly, now Patent No. 2,596,063, May 6, 1952.

The primary object of the present invention is to provide a cleaning device in the class above mentioned which embodies improved principles of design and construction facilitating replacement of the resilient wiping element when it becomes worn or damaged.

A further object of the invention is to provide a construction and arrangement of parts and assemblies which will permit, under all operating conditions, a substantially uniform transmission and distribution of the pressure of the wiper arm throughout the length of the wiping edge of the resilient element designed to contact the glass.

A further object of the invention is to provide a wiper assembly in which the friction encountered in flexing the wiping element to accommodate irregularities in the surface to be wiped is reduced to a minimum to facilitate such flexing in order that a better wiping result may be achieved.

A further object of the invention is to provide a construction and arrangement of parts which will permit without the use of tools, the ready replacement of the resilient wiping element embodied therein, in order that a minimum of time may be required for such replacements, which replacement are made usually on busy drives of gasoline service stations under conditions where the car owner and the station attendant each are desirous of shortening the time required for the service operation.

A further object of the invention is to provide a design and arrangement of parts which will facilitate the manufacture of the parts and will facilitate their assembly, in the manufacture of the complete assembly, in the manufacture of subassemblies thereof, and in the manufacture of replacement or refill assemblies as will be hereinafter described.

A further object of the invention is to provide a construction and arrangement of parts which will permit the employment of the reactive force of a portion of the resilient wiping element, after being subjected to compression for the purpose, in the locking in connection therewith of a clip serving to hold the parts of said assembly in correct operative relationship. By so employing such reactive force, the necessity for separate springs or other resilient members is avoided, the manufacture and use of the invention are facilitated, and its cost of manufacture is reduced.

A further object of the invention is to provide slideable connections of maximum width and stability between coactive assemblies of the invention.

A further object of the invention is to provide simple and effective means by which the complete assembly may be locked securely to means employed for driving the assembly, said locking means being so constructed and arranged as to permit manual removal of said assembly from said driving means.

Another object of the invention is to provide means by which the complete assembly may be operatively connected readily to a variety of makes and types of windshield wiper arms widely used.

Another object of the invention is to provide a design and construction of parts and assemblies which will minimize the width of the device and thereby minimize its obstruction to vision.

Other objects and advantages of the invention will become evident after considering the description hereinafter set forth in conjunction with the drawings annexed hereto.

In the drawings,

FIGURE 1 is a top view of the complete assembly;

FIGURE 2 is a side view in elevation of the assembly illustrated in FIGURE 1, including a particular type of wiper arm, with the parts thereof shown in their relative positions when the assembly is applied to a windshield having a substantially planar surface;

FIGURE 3 is a side view in elevation of the assembly illustrated in FIGURE 1, including a different type of wiper arm, with the parts thereof shown in their relative positions when the assembly is applied to a windshield having a curved surface;

FIGURE 4 is a partial section taken substantially on line 4—4 of FIGURE 1;

FIGURE 5 is a section taken substantially on line 5—5 of FIGURE 1;

FIGURE 6 is a view illustrating the assembled connection between a part of the complete assembly and a wiper arm, portions of which are in section for the purpose of clearly illustrating the locking means;

FIGURE 7 is a section of one end of the assembly as viewed from the underside;

FIGURE 8 is a transverse section taken at an appropriate location through FIGURE 6;

FIGURES 9 through 12 exemplify a modified construction of the invention, FIGURE 9 being an end view of an improved fastening means;

FIGURE 10 is a view illustrating parts of such modified construction;

FIGURE 11 is an end view of such parts assembled; and

FIGURE 12 is a top view of a section of such assembly.

Referring to FIGURE 2 of the drawing, numeral 1 designates the outer extremity of a conventional wiper arm supporting a complete wiper blade assembly generally designated 2 in a manner to press the wiper means or wiping element 3 either against a substantially planar surface or a curved surface to be cleaned. The element 3 is secured to spring-like holder means or support 4, both constituting a blade unit constructed to normally assume a straight condition as exemplified in FIGURE 2.

More specifically, the element 3 is constructed of some desirable resilient material such as rubber and preferably includes a wiper head portion 5, generally triangular in cross-section, and an attaching portion 6, generally rectangular in cross-section, which portions are pivotally joined together by a reduced or neck portion 7. Stated otherwise, the sides of the element are interrupted by a pair of oppositely disposed longitudinally extending corresponding recesses or grooves 8 to provide pivotally connected parts or portions. The reduced portion 7 permits the wiper head 5 to yield or pivot with respect to the portion 6 adjacent the beginning of each stroke of the wiping means as it travels back and forth over the windshield glass.

The triangular wiper head 5 is provided with a plurality of wiping edges or arrises 9 and a lip 10, the latter having wiping edges 11, which are adapted to alternately engage the glass. Certain of the auxiliary wiping edges 9 may also be caused to engage and clean the glass, depending upon the pressure applied to the wiper arm and the resistance of extraneous matter encountered on the glass. It is to be understood that the wiping portion as well as the attaching portion of the wiper blade unit may be constructed otherwise than illustrated. For example, the wiping head may be entirely eliminated, in which event the neck portion 7 would be of a desirable size and provided with wiping edges corresponding to the edges 11 whereby to accomplish the result comprehended by the invention. Furthermore, the blade unit or assembly may be comprised of a plurality of plies or laminations of rubber or the equivalent, and if desired these may be bonded or otherwise secured to a holder or backing, whether substantially rigid or flexible in character.

The wiper element 3 and support 4 are preferably connected together by an interlocking arrangement. As clearly illustrated, the marginal side walls of the attaching portion 6 of the element are interrupted by a pair of oppositely disposed longitudinaly extending corresponding grooves or receses 12 which receive a pair of corresponding flexible members or strips or backing means 13 constituting the support for the resilient wiping element. These strips are preferably constructed of relatively thin metal strip stock, but may be made from any material suitable for the purpose. In certain applications of the invention, it may be considered advantageous to construct the holder or support in one piece. The wiper element and holder may be assembled as desired but the preferred method is to insert the strips 13 into the grooves 12, the reduced portion or neck resulting from the grooves being disposed between such strips. The strip portions 13 may then be permanently secured together in spaced apart parallel relation by a pair of corresponding fastening means 14 preferably disposed adjacent the extremities of the wiper unit, such securement being effected subsequent to attaching a carriage or linkage assembly 15 to such unit.

The fastening means 14 are substantially identical in character and accordingly, a description of one is deemed sufficient. Each preferably includes a rounded top wall portion 16 which overlies the upper surface of the attaching portion 6 of the wiping element, offset U-shaped formations or ears 17 provided adjacent one extremity of the wall 16 for receiving the strips 13, and a transverse stop portion 18 adjacent the opposite extremity of said wall which may be engaged by the end margins of the strips and wiping element whereby to prevent relative longitudinal movement therebetween. The U-shaped formations or ears 17 extend in opposite directions and are adapted to be clamped down against the strips as clearly illustrated in FIGURES 4 and 7. More specifically in this respect, the extremity of each strip is preferably provided with a circular opening 19 so that a portion 20 of each formation or ear may be pressed into such opening for locking against accidental separation. It is to be understood that other fastening means suitable for this purpose may be employed and that they may be secured to the holder or support in ways different from the one just described, one alternative construction being illustrated in FIGURES 9 through 12, which, will be described subsequently. The fastening means 14 is so constructed as to permit its removal by applying to it in a direction lengthwise of the strip force in excess of the resistance necessary normally to prevent displacement.

The carriage or linkage assembly 15 above referred to serves to support the wiper unit and distribute the desired pressures thereagainst in accordance with the objects of the invention. This assembly 15 includes a pair of elongated yokes or links 21 and 22, substantially identical in design and construction, which are associated with the wiper unit. More particularly in this respect, the outer end 23 of the link 21 is preferably connected adjacent to one extremity of the support 4 for the resilient wiping element and its inner end 24 is similarly slideably connected to the support at a point spaced longitudinally inwardly from the first point of connection. The ends of the other link 22 are also similarly connected to the support. The ends of the yokes on links are of a size and shape to receive the upper portion of the wiping element with sufficient clearances to prevent binding whenever the wiper unit slides with respect to the links during a wiping operation. The link ends include offset U-shaped ears comprised of bearing portions 25 and 26 which slideably engage the strips 13, the fit therebetween being relatively loose to provide a free action, yet sufficiently firm to impart stability to the assembly, thus providing clamp or attachment means between the link and strips 13. More particularly in this respect, it will be noted that links 21 and 22 are provided adjacent their ends wtih cross portions having at their ends offset U-shaped ears which engage the outer lateral extremities of strip 13. Thus is provided maximum distance between opposite points of engagement which distance effects a maximum of stability of the wiper blade assembly against torsion and effects a minimum of friction between said ears and said strips. This reduction of friction and torsional cramping is of great importance in providing freedom of flexibility necessary for effective performance under varying conditions. The opposite extremities of elongated bridge means 27 are preferably pivotally connected to intermediate portions of the links by means of pivots 28 which extend through the parts. The bridge means is provided with connection means 29 whereby the wiper unit may be detachably connected to the free ends of different types or models of wiper arms. The connection means 29 will be described more in detail subsequently.

Attention is directed to the fact that those portions of the support and resilient element between the ends of the links each constitute a cleaner, the same being true of the central portions between the inner ends of the links, and that such central portions in effect resiliently connect the first mentioned or outer cleaners together. In other words, were the middle section to be removed, the outer sections or portions of the wiping element would function independently when fastening means 14 are suitably provided adjacent the ends 24 and 25, respectively, of links 21 and 22. This fact is mentioned not because there is likely to be any practical use for such a modified assembly but rather to emphasize the integration of related portions of the wiping element into one coacting unit. As clearly exemplified, the links and the bridge means are made preferably slightly bowed or arcuate in shape in order to provide sufficient clearances for the outward flexing or bending of those portions of the holder and wiping element intermediate the points of connection between the links and the wiper unit when such unit is applied to a curved surface. It is also to be noted that the links and bridge means are preferably channel-shape in form so as to impart rigidity thereto and so that the enlarged channel extremities of the bridge means will receive the links. Sufficient bearing or abutting surfaces are provided between the fastening means, links, and bridge to insure a stable assembly and yet permit sufficient movement between the parts whereby to assist the wiping head of the wiper to yield or pivot as it begins each stroke of the wiping operation.

The parts are so constructed and arranged that the holder or support and wiper element will function to maintain the entire wiping edge or edges of the element in proper wiping contact or engagement with the surface to be cleaned. Such an arrangement requires that the support be yieldable in one plane yet sufficiently rigid in a plane transverse thereto to assure smooth operation of the device. These factors are important in order that the wiping element may automatically adjust itself to substantially any windshield surface that might be employed to advantage in the automotive industry. Of further importance is the fact that the degree of curvature of the windishield and the length of the wiping element must both be considered in determining the arrangement and construction of the complete wiper blade assembly as herein described. The thickness of strips 13 determines the pressures necessary to apply to hold the wiper blade unit in substantial conformity with a curved glass. Since available wiper arm pressures are limited in value, it is desirable to reduce the thickness of the strips 13. However, when that thickness is reduced beyond a certain determinable point, the assembly lacks adequate stability to insure consistent performance and the wiping element tends to chatter while moving across the glass.

As the length of the blade is increased, a point is reached where a thickness in strips 13 adequate to provide proper "hugging" of the glass throughout the entire length of the wiping element produces a resistance to flexing requiring more pressure than is available with the conventional types of commercial windshield wiper arms. This problem threatened to seriously limit the lengths in which blades constructed similarly to those shown in the copending application of John W. Anderson, Ser. No. 634,729, could be effectively applied.

The present invention however, reduces the span between the pivotal points of connection between the links and support and thereby brings within practicable limits, the problems of reconciling the resistance of the strips or members 13 to flexing with available arm pressures, while at the same time maintaining substantially uniform pressure against the windshield throughout the entire length of the wiper element.

The connection means 29, above referred to, is unique in character and, among other things, includes a base wall 30 and widened side walls 31 of the bridge means, which walls are preferably notched to provide an opening 32 for the reception of an entering part in the form of a cross pivot 33, carried by a fitting 34, attached to the outer extremity of the wiper arm 1, as exemplified in FIGURES 1 and 6. A spring latch 35 is housed substantially within the confines of the walls just referred to and is pivoted at 36 and serves to obstruct the opening 32 for the purpose of detachably holding the complete wiper assembly to the arm. The latch may be constructed as desired but is preferably of channel shape and includes a base strike portion 37, side walls 38, and finger portions 39 extending outwardly from the side walls for manual engagement.

The spring 40 of the latch is generally U-shaped in character and includes a pair of legs 41 and 42 joined together by a bight or loop portion 43. The spring 40 prior to being assembled with the latch, normally assumes an expanded position as illustrated by the dotted lines in FIGURE 6. After the latch has been secured in place by pivot 36, the spring is contracted and inserted into the latch to the illustrated full line position so that the leg 41 bears against the inturned portions 44 of the side walls 31 of the bridge means, and the leg 42 engages the base strike portion 37 of the latch to normally urge and maintain such portion against the base wall 30 of the bridge to block the opening 32.

Attention is directed to the fact that the bight portion 43 of the spring is of such a size that the same snaps into holding relation with the pivot 36 and due to the fact that the legs of the spring are normally maintained in a contracted state or condition, the bight portion is firmly held in the desired position for influencing the operation of the latch. It will also be noted that the end of the leg 42 is preferably curved as indicated at 45 so as to assist in passing the leg 42 into the space between the pivot 36 and strike portion 37 as well as reduce the friction when the strike portion of the latch slideably engages the curved portion 45. Attention is also directed to the fact that the inner marginal edges 46 of the side walls 38 of the latch are positioned at an angle with reference to the strike portion so that if for any reason the wiper assembly and arm tend to become separated, the cross pivot 33 will engage the margins 46 and since the strike portion is backed against the base wall of the bridge, there is no chance for such parts to be disconnected.

To assemble the entering or cross pivot 33 with the connection means, the entering part is pressed against the strike portion of the latch which yields and then snaps back into the full line position illustrated when the entering part is seated in the opening. To disconnect the parts it is merely necessary to manually engage the finger portions 39 to pivot the latch so that the strike portion will clear the opening 32, whereupon the entering part may be removed.

As clearly exemplified in FIGURES 1, 3 and 6, the base wall 30 of the connection means is also provided with an aperture 47 closely related to the opening 32 so that hook-like entering part 48 carried by an arm may be inserted into the opening 32 and aperture 47 whereby the hook will receive the portion 49 separating such opening and aperture. The connection means 29 in effect, is of a universal character in that it provides means whereby arms carrying entering parts of different characters may support the complete wiper assembly. It is important to note that the connection means is so constructed and arranged that it does not increase the overall width of the complete wiper assembly, thereby minimizing its obstruction to vision.

The embodiment of the invention illustrated in FIGURES 9 through 12 will now be considered. This embodiment of the invention is of major importance in that provision is made whereby the wiper unit comprised of a resilient wiping element and a holder may be more readily detachably connected to the carriage or linkage assembly 15, thereby presenting an arrangement whereby when the wiper blade unit becomes worn or damaged, the same may be easily removed and a new one assembled within the linkage assembly. More specifically in this respect, and as clearly illustrated in FIGURE 10, the opposite end of each flexible strip comprising the holder or support is provided with a portion 50 of a width less than the width of the strip. The narrow portion 50 is formed by providing the longitudinal marginal edges of each strip with a substantially rectangular notch 51, which notches are located inwardly from the ends of the strips. The corners of the strips are preferably rounded as indicated at 52. The flexible strips of this embodiment are adapted to be inserted into the grooves or recesses provided in the attaching portion of the resilient wiping element as illustrated in FIGURES 10, 11 and 12 and in accordance with the first embodiment. A pair of fastening means 53, identical in character and corresponding substantially to the fastening means 14, are adapted to be forced over the ends of the wiper blade unit so that the junction walls 54 provided on the ears will be received in the notches 51 and the remaining portions of the ears will embrace portion 50 whereby to hold the strips, resilient wiping element, and the links assembled.

The rounded corners 52 provided adjacent the ends of the strips assist in piloting the fastening means over such ends. The parts are preferably so constructed and arranged that when the fastening means are forced upon the strips, the latter will be directed toward each other to compress that portion of the wiping element between such strips, thereby offering reactive resilience to cause the fastening means to snap into position when the walls 54 thereof are received in the notches 51. In other words, a portion of the resilient wiping element must be compressed in the process of applying fastening means 53, and reacts when such means reaches its operative position with relation to notches 51 so that means 53 engages said notches to detachably hold the fastening means securely against accidental displacement until detached by manual pressure directing the strips toward each other with sufficient force to again compress the wiping element to permit ready removal of such means.

Attention is further directed to the fact that when the fastening means 53 are secured in place, portions of the wiping element are in a position to recede or expand into those notches 51 which face the attaching portion of such element whereby to reduce the amount of such manual pressure required. Also, it should be noted that since the strips comprising the holder are identical in character they may be easily and quickly assembled with the wiping element, without selectively positioning such parts for assembly, this factor being of considerable importance from the standpoint of speeding up assembly operations and reducing assembly costs.

Accordingly, it will be evident that the invention includes improved wiper means and a support therefor, which are associated or connected together in a manner whereby they may flex or yield while traveling over and wiping a concave or convex surface or combination of such surfaces, as well as for superior wiping operation against a substantially planar surface to be cleaned.

Also, the invention constitutes a notable advance in the design and construction of windshield wiper apparatus by the provision of a carriage or linkage assembly which serves to distribute to the wiper element the pressure exerted by the wiper arm so that the entire or full length of the wiping edge or edges of such element are applied uniformly to the glass to obtain the "hugging" action necessary to a clean wipe.

It will also be manifest that improved operative connections have been provided between the carriage assembly and the support for the wiping element. Also, that improved connection means have been provided which permits the wiper assembly to be detachably connected with respect to wiper arms carrying different types of entering or attaching means.

Moreover, it will be apparent that unique means have been provided whereby when the original wiper unit becomes worn or damaged, it may be easily removed and replaced by a new unit, this effecting an appreciable saving to the car owner and a conservation of labor and material.

Having thus described my invention, it is obvious that various modifications may be made in the same without departing from the spirit of the invention; and, therefore, I do not wish to be understood as limiting myself to the exact forms, constructions, arrangements, and combinations of parts herein shown and described.

I claim:

1. A windshield wiper unit comprising an elongated resilient flexible body having a back portion and a wiping edge conformable to a surface to be wiped, a pair of spaced transversely aligned grooves formed in the body extending substantially throughout the length thereof and positioned between said back portion and said wiping edge, elongated backing means flexible in a plane substantially perpendicular to the surface to be wiped and substantially inflexible in a plane at right angles to said first-mentioned plane, said backing means having a pair of spaced longitudinally extending marginal edges positioned in said transversely aligned grooves, said backing means in its entirety being positioned below said back portion and being normally generally flat and lying in a plane generally parallel to the surface to be wiped and normally generally at right angles to said wiping edge, in combination with a superstructure for said unit for applying pressure thereto to cause the wiping edge of the flexible body to conform to the surface being wiped, said superstructure including longitudinally spaced apart holder means and a yoke extending lengthwise of the medial portion of said yoke and each extending inwardly and outwardly in the direction of the length of said unit from its medial pivotal connection with said yoke, each end portion of each of the holder means including oppositely laterally projecting side portions rigidly related to each other positioned to overlie portions of said backing means inwardly and outwardly of said pivotal connections for exerting downward pressure on the outer portions of said backing means, inwardly and outwardly of the pivotal connections, said laterally projecting side portions having extremities extending downwardly and inwardly below the opposite outer portions of said backing means to straddle the same inwardly and outwardly of said pivotal connections for retaining said marginal edges of said backing means in said grooves, the inner ends of each of said holder means being spaced apart a substantial distance to provide a freely flexible medial span of said backing means.

2. A windshield wiper device, comprising a wiper unit, said unit including an elongated resilient flexible body having a back portion and a wiping edge conformable to a surface to be wiped, a pair of transversely aligned grooves formed in the body extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of uninterrupted longitudinally extending edges positioned in said pair of transversely aligned grooves longitudinally spaced apart clamp means connected to said unit, and means for applying pressure to said clamp means to cause the wiping edge of the flexible body to conform to the surface being wiped, said last named means comprising a plurality of interconnected pressure applying members extending longitudinally of said wiper unit integrally connected to said clamp means, at least one of said clamp means being longitudinally slidable relative to said wiper unit.

3. A windshield wiper device, comprising a wiper unit, said unit including an elongated resilient flexible body having a back portion and a wiping edge conformable to a surface to be wiped, a plurality of transversely aligned indentations formed in the body extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of longitudinally extending portions, said portions having edges positioned in said transversely aligned indentations, longitudinally spaced apart attachment means connected to said unit, and means for applying pressure to said attachment means to cause the wiping edge of the flexible body to conform to the surface being wiped, said last named means comprising a plurality of interconnected pressure applying members extending longitudinally of said wiper unit integrally connected to said attachment means, at least one of said attachment means being longitudinally slidable relative to said wiper unit.

4. A windshield wiper device, comprising a wiper unit, said unit including an elongated resilient flexible body having a back portion and a wiping edge conformable to a surface to be wiped, said body having a formed portion thereon extending substantially throughout the length thereof and positioned between said back portion and said wiping edge, and elongated backing means flexible in a plane substantially perpendicular to the surface to be wiped and substantially inflexible in a plane at right angles to said first mentioned plane, said backing means having means interconnecting with said body formed portion, longitudinally spaced apart attachment means connected to said unit, and means for applying pressure to said attachment means to cause the wiping edge of the flexible body to conform to the surface being wiped, said last named means comprising a plurality of interconnected pressure applying members extending longitudinally of said wiper unit integrally connected to said attachment means, at least one of said attachment means being longitudinally slidable relative to said wiper unit.

5. A windshield wiper device, comprising a wiper unit, said unit including an elongated resilient flexible body having a back portion and a wiping edge conformable to a surface to be wiped, a plurality of transversely aligned indentations formed in the body extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of longitudinally extending portions, said portions having edges positioned in said transversely aligned indentations, in combination with a superstructure for said unit for applying pressure thereto to cause the wiping edge of the flexible body to conform to the surface being wiped, said superstructure including longitudinally spaced apart holder means and a yoke extending lengthwise of the medial portion of said unit, each of said holder means being pivotally connected intermediate its ends to a respective end portion of said yoke and each extending inwardly and outwardly in the direction of the length of said unit from its medial pivotal connection with said yoke, each end portion of each of the holder means including oppositely laterally projecting side portions rigidly related to each other positioned to overlie portions of said backing means inwardly and outwardly of said pivotal connections for exerting downward pressure on the outer portions of said backing means, inwardly and outwardly of the pivotal connections, said laterally projecting side portions having extremities extending downwardly and inwardly below the opposite outer portions of said backing means to straddle the same inwardly and outwardly of said pivotal connections for retaining said edges of said backing means portion in said indentations, the inner ends of each of said holder means being spaced apart a substantial distance to provide a freely flexible medial span of said backing means.

6. A windshield wiper device, comprising a wiper unit, said unit including an elongated resilient flexible body having a back portion and a wiping edge conformable to a surface to be wiped, said body having a formed portion thereon extending substantially throughout the length thereof and positioned between said back portion and said wiping edge, and elongated backing means flexible in a plane substantially perpendicular to the surface to be wiped and substantially inflexible in a plane at right angles to said first mentioned plane, said backing means having means interconnecting with said body formed portion, in combination with a superstructure for said unit for applying pressure thereto to cause the wiping edge of the flexible body to conform to the surface being wiped, said superstructure including longitudinally spaced apart holder means and a yoke extending lengthwise of the medial portion of said unit, each of said holder means being pivotally connected intermediate its ends to a respective end portion of said yoke and each extending inwardly and outwardly in the direction of the length of said unit from its medial pivotal connection with said yoke, each end portion of each of the holder means including oppositely laterally projecting side portions rigidly related to each other positioned to overlie portions of said backing means inwardly and outwardly of said pivotal connections for exerting downward pressure on the outer portions of said backing means, inwardly and outwardly of the pivotal connections, said laterally projecting side portions having extremities extending downwardly and inwardly below the opposite outer portions of said backing means to straddle the same inwardly and outwardly of said pivotal connections for retaining the interconnecting means of said backing means in said body formed portion, the inner ends of each of said holder means being spaced apart a substantial distance to provide a freely flexible medial span of said backing means.

7. A windshield wiper unit comprising an elongated resilient flexible body having a back portion and a wiping edge conformable to a surface to be wiped, a pair of transversely aligned grooves formed in the body extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of longitudinally extending edges positioned in said pair of transversely aligned grooves, in combination with a superstructure, said superstructure including spaced apart integral clamp means having their end portions partially surrounding parts of said back portion and said backing means for retaining said backing means in lateral engagement with said grooves, the end portions of each of said clamp means being longitudinally rigidly aligned with each other, and all said clamp means having longitudinal sliding movement with respect to said unit, whereby said unit is free to slide with respect to all clamp means, and means for applying pressure at spaced apart points to said unit to conform the wiping edge thereof to the surface being wiped, said pressure applying means including an elongated bridge member rockably connected adjacent its ends with said clamp means substantially medial the ends of each of the latter, said unit intermediate said clamp means providing a free medial span capable of elongation by lengthwise movement of said unit in said clamp means.

8. A windshield wiper device, comprising a wiper unit, said unit including an elongated resilient flexible body having a back portion and a wiping edge conformable to a surface to be wiped, a plurality of transversely aligned indentations formed in the body extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of longitudinally extending portions, said portions having edges positioned in said transversely aligned indentations, in combination with a superstructure, said superstructure including spaced apart integral clamp means having their end portions partially surrounding parts of said back portion and said backing means portions for retaining said backing means in lateral engagement with said indentations, the end portions of each of said clamp means being longitudinally rigidly aligned with each other, and all said clamp means having longitudinal sliding movement with respect to said unit, whereby said unit is free to slide with respect to all clamp means, and means for applying pressure at spaced apart points to said unit to conform the wiping edge thereof to the surface being wiped, said pressure applying means including an elongated bridge member rockably connected adjacent its ends with said clamp means substantially medial the ends of each of the latter, said unit intermediate said clamp means providing a free medial span capable of elongation by lengthwise movement of said unit in said clamp means.

9. A windshield wiper device, comprising a wiper unit, said unit including an elongated resilient flexible body having a back portion and a wiping edge conformable to a surface to be wiped, said body having a formed portion thereon extending substantially throughout the length thereof and positioned between said back portion and said wiping edge, and elongated backing means flexible in a plane substantially perpendicular to the surface to be wiped and substantially inflexible in a plane at right angles to said first mentioned plane, said backing means having means interconnecting with said body formed portion, in combination with a superstructure, said superstructure including spaced apart integral clamp means having their end portions partially surrounding parts of said back portion and said backing means for retaining the interconnecting means of said backing means in lateral engagement with said body formed portion, the end portions of each of said clamp means being longitudinally rigidly aligned with each other, and all said clamp means having longitudinal sliding movement with respect to said unit, whereby said unit is free to slide with respect to all clamp means, and means for applying pressure at spaced apart points to said unit to conform the wiping edge thereof to the surface being wiped, said pressure applying means including an elongated bridge member rockably connected adjacent its ends with said said clamp means substantially medial the ends of each of the latter, said unit intermediate said clamp means providing a free medial span capable of elongation by lengthwise movement of said unit in said clamp means.

10. The claimed subject matter of claim 1 wherein all of said end portions of said holder means are slidable with respect to the backing means.

References Cited

UNITED STATES PATENTS

| | | | |
|---|---|---|---|
| 2,045,141 | 6/1936 | Horton et al. | 15—245 |
| 2,254,343 | 9/1941 | Zierer | 15—250.8 X |
| 2,596,063 | 5/1952 | Anderson | 15—250.8 X |
| 2,548,904 | 4/1951 | Anderson | 15—250.7 |
| 2,432,693 | 12/1947 | Anderson | 15—250.7 |
| 1,510,509 | 10/1924 | Stadeker. | |
| 1,953,635 | 4/1934 | Rose | 15—250.7 |
| 2,095,396 | 10/1937 | Nielsen | 15—250.7 |
| 2,149,037 | 2/1939 | Zaiger | 15—250.7 |
| 2,156,506 | 5/1939 | Marcolivio | 15—250.7 |
| 2,303,694 | 12/1942 | Horton | 15—245 |

FOREIGN PATENTS

| | | |
|---|---|---|
| 572,388 | 1924 | France. |
| 427,383 | 4/1935 | Great Britain. |

CHARLES A. WILLMUTH, *Primary Examiner.*

SIDNEY JAMES, ELI J. SAX, *Examiners.*

UNITED STATES PATENT OFFICE
CERTIFICATE OF CORRECTION

Patent No. 3,372,422                                  March 12, 1968

John W. Anderson

It is certified that error appears in the above identified patent and that said Letters Patent are hereby corrected as shown below:

Column 4, line 8, "on" should read -- or --. Column 7, line 72, after "said" insert -- unit, each of said holder means being pivotally connected intermediate its ends to a respective end portion of said --. Column 11, line 13, cancel "said", second occurrence.

Signed and sealed this 16th day of September 1969.

(SEAL)
Attest:

Edward M. Fletcher, Jr.                        WILLIAM E. SCHUYLER, JR.
Attesting Officer                                      Commissioner of Patents